(12) United States Patent
Tripathi et al.

(10) Patent No.: US 10,970,323 B2
(45) Date of Patent: Apr. 6, 2021

(54) METHOD AND SYSTEM FOR PROVIDING SUGGESTIONS FOR COMPLETING USER-QUERY

(71) Applicant: Innoplexus AG, Eschborn (DE)

(72) Inventors: Gaurav Tripathi, Pune (IN); Vatsal Agarwal, Rampur (IN); Abhilash Bolla, Vododara (IN); Dileep Dharma, Pune (IN)

(73) Assignee: Innoplexus AG, Eschborn (DE)

( * ) Notice: Subject to any disclaimer, the term of this patent is extended or adjusted under 35 U.S.C. 154(b) by 190 days.

(21) Appl. No.: 16/233,840

(22) Filed: Dec. 27, 2018

(65) Prior Publication Data

US 2019/0205324 A1 Jul. 4, 2019

(30) Foreign Application Priority Data

Dec. 30, 2017 (GB) ..................................... 1722308

(51) Int. Cl.
| | | |
|---|---|---|
| *G06F 16/00* | (2019.01) | |
| *G06F 16/332* | (2019.01) | |
| *G06F 16/28* | (2019.01) | |
| *G06F 16/36* | (2019.01) | |

(52) U.S. Cl.
CPC ........ *G06F 16/3329* (2019.01); *G06F 16/285* (2019.01); *G06F 16/3322* (2019.01); *G06F 16/3323* (2019.01); *G06F 16/367* (2019.01)

(58) Field of Classification Search
CPC ............... G06F 16/285; G06F 16/3322; G06F 16/3323; G06F 16/3329; G06F 16/367
USPC .................................................. 707/705–780
See application file for complete search history.

(56) References Cited

U.S. PATENT DOCUMENTS

| | | | | |
|---|---|---|---|---|
| 8,037,068 | B2* | 10/2011 | Halevy | G06F 16/951 |
| | | | | 707/736 |
| 9,996,523 | B1* | 6/2018 | Su | G06F 3/0237 |
| 10,762,293 | B2* | 9/2020 | Ramerth | G06F 40/169 |
| 2005/0138018 | A1* | 6/2005 | Sakai | G06F 16/355 |
| 2008/0228812 | A1* | 9/2008 | Oglesby | G06F 8/20 |
| 2010/0332478 | A1* | 12/2010 | Duman | G06F 16/35 |
| | | | | 707/738 |
| 2012/0161940 | A1* | 6/2012 | Taylor | G01D 21/00 |
| | | | | 340/10.3 |
| 2012/0303356 | A1* | 11/2012 | Boyle | G06F 40/30 |
| | | | | 704/9 |

(Continued)

*Primary Examiner* — Michelle N Owyang
(74) *Attorney, Agent, or Firm* — Ziegler IP Law Group, LLC (57) ABSTRACT

Disclosed is a method of providing at least one suggestion for completing a user-query, the method comprising receiving the user-query related to a domain of user-interest; determining if the domain of user-interest corresponds to the subject matter; identifying at least one element of the user-query; classifying the at least one element into at least one class using the ontology; changing the class of the at least one element occurring at an end position within the user-query to the others class; identifying the at least one element of the concept class occurring at a farthest position within the user-query; concatenating the at least one element of the concept class occurring at the farthest position with each of the at least one element occurring thereafter, to obtain a concatenated string of elements; identifying at least one suggestion using the ontology; and providing the at least one suggestion for completing the user-query.

19 Claims, 2 Drawing Sheets

(56) References Cited

U.S. PATENT DOCUMENTS

| | | | |
|---|---|---|---|
| 2013/0013580 A1* | 1/2013 | Geller | G06F 16/285 |
| | | | 707/706 |
| 2014/0365880 A1* | 12/2014 | Bellegarda | G06F 40/30 |
| | | | 715/261 |
| 2015/0161291 A1* | 6/2015 | Gur | G06F 16/904 |
| | | | 707/722 |
| 2017/0242913 A1* | 8/2017 | Tijssen | G06F 40/247 |
| 2018/0107760 A1* | 4/2018 | Saha | G06F 16/24554 |

* cited by examiner

METHOD AND SYSTEM FOR PROVIDING SUGGESTIONS FOR COMPLETING USER-QUERY

CROSS-REFERENCE TO RELATED APPLICATIONS

This application claims the benefit under 35 U.S.C. § 119(a) and 37 CFR § 1.55 to UK Patent Application No. GB1722308.2, filed on Dec. 30, 2017, the entire content of which is incorporated herein by reference.

TECHNICAL FIELD

The present disclosure relates generally to data processing; and more specifically, to methods and systems for providing suggestions for completing user-queries. Moreover, the present disclosure also relates to computer readable medium containing program instructions for execution on a computer system, which when executed by a computer, cause the computer to perform method steps for providing suggestions for completing user-query.

BACKGROUND

Generally, curiosity or requirement of information drives an individual to access various information sources for obtaining such information. Moreover, there are multiple platforms which act as information sources. Historically, printed media (such as books, encyclopaedias, and so forth) were a primary information source of knowledge and content. However, with advancements in technology, Internet has now replaced printed media as the primary information source due to easy accessibility and improved availability. Furthermore, such advancement in technology has enabled users to access enormous amounts of widespread information available through the Internet.

Conventionally, the user uses a software system, such as a search engine, in order to access desired information associated with a domain of their user-interest, such as self-help, beauty products, medications, research topics and so forth. Specifically, the user provides a query, including keywords associated with the desired information, to the search engine. Furthermore, the search engine may provide suggestions and/or options to the user in order to help them complete their query. Consequently, such a technique of providing suggestions to the user for completing their query (namely, auto-complete techniques) makes accessing the desired information easier and faster for the user. However, conventional auto-complete techniques face various drawbacks.

Specifically, the conventional auto-complete techniques consider a user's browser history for providing suggestions and/or options for auto-completion of the query. Consequently, such auto-complete techniques are unable to provide the suggestions and/or options when the user's browser history is restricted (such as, for privacy of the user). Furthermore, the currently available auto-complete techniques face difficulty in auto-completion when the query is unrelated to the information previously accessed by the user (such as, the information associated with their browser history). Furthermore, the currently available auto-complete techniques only consider a last element of the query for suggesting a next possible element for the query. Consequently, the next possible elements that are suggested to the user, based solely on the last element of the query, result in inaccurate and/or irrelevant suggestions provided to the user. Such inaccurate and/or irrelevant suggestions may require the user to exert manual effort in typing the next element in the query, thereby making auto-completion of the query redundant. Furthermore, the conventional auto-complete techniques are slow, inefficient and may not provide optimal suggestions in response to specific queries (such as, queries comprising multiple technical concepts).

Therefore, in light of the foregoing discussion there exists a need to overcome the aforementioned drawbacks associated with conventional techniques for providing suggestions for completing user-queries.

SUMMARY

The present disclosure seeks to provide a method of providing at least one suggestion for completing a user-query. The present disclosure also seeks to provide a system for providing at least one suggestion for completing the user-query. Furthermore, the present disclosure seeks to provide a computer readable medium, containing program instructions for execution on a computer system, which when executed by a computer, cause the computer to perform method steps for providing at least one suggestion for completing a user-query. The present disclosure seeks to provide a solution to the existing problems associated with conventional auto-complete techniques that provide slow, irrelevant and sub-optimal suggestions for completing user-queries. An aim of the present disclosure is to provide a solution that overcomes at least partially the problems encountered in the prior art, and provides an efficient and reliable method and system for providing at least one suggestion for completing user-queries.

In one aspect, an embodiment of the present disclosure provides a method of providing at least one suggestion for completing a user-query, the method comprising:
a) receiving the user-query related to a domain of user-interest;
b) determining if the domain of user-interest corresponds to the subject matter using an ontology that relates to the subject matter;
c) identifying at least one element of the user-query when the domain of user-interest corresponds to the subject matter;
d) classifying the at least one element into at least one class using the ontology, characterized in that the at least one class comprises a concept class and an others class;
e) changing the class of the at least one element occurring at an end position within the user-query to the others class, if the class of the at least one element is the concept class;
f) identifying the at least one element of the concept class occurring at a farthest position within the user-query;
g) concatenating the at least one element of the concept class occurring at the farthest position within the user-query, with each of the at least one element occurring thereafter, to obtain a concatenated string of elements;
h) identifying at least one suggestion associated with the concatenated string of elements using the ontology; and
i) providing the at least one suggestion for completing the user-query.

In another aspect, an embodiment of the present disclosure provides a system for providing at least one suggestion for completing a user-query, the system comprising:
a processing module operable to:
receive the user-query related to a domain of user-interest;
determine if the domain of user-interest corresponds to the subject matter using an ontology that relates to the subject matter;

identify at least one element of the user-query when the domain of user-interest corresponds to the subject matter;

classify the at least one element into at least one class using the ontology, characterized in that the at least one class comprises a concept class and an others class;

change the class of the at least one element occurring at an end position within the user-query to the others class, if the class of the at least one element is the concept class;

identify the at least one element of the concept class occurring at a farthest position within the user-query;

concatenate the at least one element of the concept class occurring at the farthest position within the user-query, with each of the at least one element occurring after the at least one element, to obtain a concatenated string of elements;

identify at least one suggestion associated with the concatenated string of elements using the ontology; and provide the at least one suggestion for completing the user-query;

and a database arrangement communicably coupled to the processing module, characterized in that the database arrangement is operable to store the ontology.

In yet another aspect, an embodiment of the present disclosure provides a computer readable medium, containing program instructions for execution on a computer system, which when executed by a computer, cause the computer to perform method steps for providing at least one suggestion for completing a user-query, the method comprising the steps of:

a) receiving the user-query related to a domain of user-interest;

b) determining if the domain of user-interest corresponds to a subject matter using an ontology that relates to the subject matter;

c) identifying at least one element of the user-query when the domain of user-interest corresponds to the subject matter;

d) classifying the at least one element into at least one class using the ontology, characterized in that the at least one class comprises a concept class and an others class;

e) changing the class of the at least one element occurring at an end position within the user-query to the others class, if the class of the at least one element is the concept class;

f) identifying the at least one element of the concept class occurring at a farthest position within the user-query;

g) concatenating the at least one element of the concept class occurring at the farthest position within the user-query with each of the at least one element occurring thereafter, to obtain a concatenated string of elements;

h) identifying at least one suggestion associated with the concatenated string of elements using the ontology; and i) providing the at least one suggestion for completing the user-query.

Embodiments of the present disclosure substantially eliminate or at least partially address the aforementioned problems in the prior art, and enables an efficient, effective, seamless and optimal method of providing relevant at least one suggestion for completing a user-query related to domain of user-interest.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams characterized in that.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present invention are concerned with methods and systems for providing suggestions for completing user-queries. The present disclosure also relates to software products recorded on machine-readable non-transient data storage media, wherein the software products are executable upon computing hardware to implement the aforementioned methods.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method of providing at least one suggestion for completing a user-query, the method comprising:

a) receiving the user-query related to a domain of user-interest;

b) determining if the domain of user-interest corresponds to the subject matter using an ontology that relates to the subject matter;

c) identifying at least one element of the user-query when the domain of user-interest corresponds to the subject matter;

d) classifying the at least one element into at least one class using the ontology, characterized in that the at least one class comprises a concept class and an others class;

e) changing the class of the at least one element occurring at an end position within the user-query to the others class, if the class of the at least one element is the concept class;
f) identifying the at least one element of the concept class occurring at a farthest position within the user-query;
g) concatenating the at least one element of the concept class occurring at the farthest position within the user-query, with each of the at least one element occurring thereafter, to obtain a concatenated string of elements;
h) identifying at least one suggestion associated with the concatenated string of elements using the ontology; and
i) providing the at least one suggestion for completing the user-query.

In another aspect, an embodiment of the present disclosure provides a system for providing at least one suggestion for completing a user-query, the system comprising:
a processing module operable to:
receive the user-query related to a domain of user-interest;
determine if the domain of user-interest corresponds to the subject-matter using an ontology that relates to the subject matter;
identify at least one element of the user-query when the domain of user-interest corresponds to the subject matter;
classify the at least one element into at least one class using the ontology, characterized in that the at least one class comprises a concept class and an others class;
change the class of the at least one element occurring at an end position within the user-query to the others class, if the class of the at least one element is the concept class;
identify the at least one element of the concept class occurring at a farthest position within the user-query;
concatenate the at least one element of the concept class occurring at the farthest position within the user-query, with each of the at least one element occurring after the at least one element, to obtain a concatenated string of elements;
identify at least one suggestion associated with the concatenated string of elements using the ontology; and
provide the at least one suggestion for completing the user-query;
and
a database arrangement communicably coupled to the processing module, characterized in that the database arrangement is operable to store the ontology.

The present disclosure provides the method and the system for providing suggestions for completing user-queries. The method considers keywords, key-phrases and elements included in the user-queries, as well as context thereof for providing the suggestions, thus, providing relevant and accurate suggestions for completing the user-queries. Furthermore, the suggestions are provided based on a combined context of various concepts included within the user-query, thereby, further improving the relevance and accuracy of the provided suggestions. Moreover, the method enables to provide suggestions for user-queries that are unrelated to information previously accessed by users. Thus, the method enables to provide relevant suggestions for completing the user-query even when information associated with the user's browser history is unavailable. The method reduces an amount of effort exerted by users in typing the complete user-queries by providing fast and relevant suggestions for completing the user-queries. Therefore, the present disclosure provides a fast, efficient and reliable method of providing optimal suggestions for completion of user-queries and the system can be used for implementing the aforementioned method.

Disclosed is the method of providing at least one suggestion for completing the user-query. The method comprises receiving the user-query related to the domain of user-interest. The user-query relates to a partially complete string of words (namely, one or more keywords, key-phrases, sentences and so forth) related to the domain of user-interest. Furthermore, the domain of user-interest is a certain field of information regarding which the user is interested. The user provides the user-query comprising the one or more keywords therein, to retrieve data associated with the domain of user-interest. In the first example, a user may have "study of cell division" as domain of user-interest. Subsequently, the user may provide "cell" as the user-query. Additionally, the user-query may be partially complete and may need one or more words for completion thereof. In such an instance, the user-query "cell" is received, wherein the user-query relates to the domain of user-interest associated with "study of cell division". Optionally, the user-query may be provided using a user interface, a GUI, a command prompt and so forth.

Furthermore, the method comprises determining if the domain of user-interest corresponds to the subject matter using an ontology that relates to the subject matter. The term "ontology" as used throughout the present disclosure, relates to a collection of data in a form of text comprising keywords, key-phrases, concepts and so forth. For example, the ontology is associated with "life sciences" and the data relates to cell division, cell mutation, blood cancer and so forth. Furthermore, the text relates to a specific field being subject matter of the ontology. Optionally, the method comprises developing the ontology that relates to the subject matter. Such ontology may be developed by retrieving, analysing and aggregating information related to the subject matter from various sources. For example, the ontology is developed by extracting data related to the subject matter from various online and/or offline data sources. Such data sources may be curated and may contain information associated with the subject matter. Optionally, the ontology is developed by performing web-crawling of sites associated with the subject matter of the ontology. In a first example, an ontology developed may have "animal and plant cells" as subject matter. The ontology related to the subject matter "animal and plant cells" may include data extracted from various websites, research papers and so forth that are related to a specific field "life-sciences".

The keywords in the user-query are analysed and matched with the concepts in the ontology, in order to determine similarity therebetween. The ontology may be accessed for retrieving concepts (namely, one or more words, keywords, key-phrases and so forth associated with a specific topic related to the subject matter) for suggesting one or more words for the user-query. Furthermore, the concepts are data elements that are included in the ontology. Furthermore, the at least one suggestion for completing the user-query may be provided only if the domain of user-interest includes an overlap (namely, similarity) with the subject matter related with the ontology. The overlap between the domain of user-interest and the subject matter related with the ontology is associated with presence of one or more common concepts therein. In an example, the user-query may be "red blood cell". In such an example, the ontology associated with "life-sciences" may comprise concepts such as "red blood cell count", "red blood cell function" or another keyword having a contextual association with the user-query of "red blood cell". Thus, the similarity is determined between the concepts in the ontology and the keywords in the user-query. In another example, the user-query is "white blood cells" and the ontology relates to "machines". In such an instance, no similarity can be determined between any concepts in the ontology and the keywords in the user-query.

Moreover, the method comprises identifying at least one element of the user-query when the domain of user-interest corresponds to the subject matter. Furthermore, the at least one element (such as, one or more words, keywords, key-phrases and so forth) of the user query is identified such that the at least one element has same contextual meaning as one or more concepts included in the ontology. It will be appreciated that, the at least one element of the user-query is associated with a specific position (namely, index) within the user-query, based on a reading-order (such as, left-to-right) of the user-query. In an example, the position of the at least one element may be based on an ascending or descending order of the at least element in the user-query, based on the reading-order. In the first example, the subject matter is "animal and plant cells" and the domain of user-interest is "study of cell division". Furthermore, the subject matter of the ontology is associated with "life-sciences", wherein such a subject matter of the ontology comprises the subject matter "animal and plant cells". For example, "cell division" is a concept in the subject matter "animal and plant cells" that reflects correspondence between the domain of user-interest and the subject matter of ontology. In such an example, the partially complete user-query "cell" associated with the domain of user-interest "study of cell division", corresponds to the subject matter of the ontology of "life-sciences".

Furthermore, the method comprises classifying the at least one element into at least one class using the ontology, characterized in that the at least one class comprises a concept class and an others class. Specifically, the at least one element is classified into at least one class based on contextual meaning thereof. Optionally, the at least one element is classified into the at least one class by employing at least one of natural language processing, text analytics and/or machine learning techniques. The natural language processing, text analytics and/or machine learning techniques may be used to perceive a contextual (namely, semantic or inferred) meaning of the at least one element. Furthermore, the aforementioned techniques analyse (namely, parse, compare and so forth) the at least one element with one or more concepts present in the ontology, to identify the contextual meaning of the at least one element. For example, a natural language toolkit (NLTK) is used to classify the at least one element into the at least one class. Such an NLTK may be operable to tokenize the at least one element into one or more keywords, key-phrases and so forth belonging to the concept class or the others class, based on the contextual meaning thereof. Furthermore, the at least one element of the user-query that corresponds to one or more concepts in the ontology are included in the concept class. Moreover, the at least one element of the user-query that does not correspond to the one or more concepts in the ontology are included in the others calls. In an example, the at least one element of the user-query may be tagged or labelled with a class (such as the concept or others class). In another example, the at least one element of the user-query may be arranged in cells of a tabular arrangement in respective columns associated with the class thereof. Optionally, the at least one element belonging to the concept class is associated with a key-phrase having a maximum number of successive words co-occurring with a concept in the ontology. In a second example, the user enters a user query "cell division and study of cell mutation" and the ontology is associated with "life-sciences". In such an example, the words "cell" and "mutation" may be concepts present in the ontology, whereas, each of the words "division", "and", "study" and "of" may not be associated with any concept present in the ontology. However, key-phrases "cell division" and "cell mutation" may be associated with concepts having maximum number of successive words co-occurring with the concept in the ontology. Thus, the elements "cell division" and "cell mutation" are each classified into the concept class whereas each of the elements "and", "of" and "study" are classified in the others class. Alternatively, when the ontology comprises a concept that relates to "study of cell mutation", the NLTK is operable to classify the phrase into the concept class, even though the words "study" and "of" individually relate to the others class.

Furthermore, the method comprises changing the class of the at least one element occurring at the end position within the user-query to the others class, if the class of the at least one element is the concept class. The user-query is traversed in order to find the at least one element at the end position thereof. Subsequently, the class of the at least one element of the user-query occurring at the end position is checked. Furthermore, if such a class of the at least one element occurring at the end position within the user-query is the concept class, the class is changed to the others class. Alternatively, if the class of the at least one element of the user-query occurring at the end position is the others class, the class thereof is retained. It will be appreciated that a context of elements occurring prior to at least one element at the end position is required to be considered for providing relevant suggestions for completing the user-query. Thus, changing the class of the at least one element at the end position enables to consider the context of the at least one element of the concept class occurring prior to the at least one element occurring at the end position, for providing the at least one suggestion. In the second example, the class of "cell mutation" is changed from the concept class to the others class.

Furthermore, the method comprises identifying the at least one element of the concept class occurring at the farthest position within the user-query. The user-query is traversed to. The user-query is traversed in the reading-order to identify the at least one element belonging to the concept class that occurs at the farthest position within the user-query. Such an at least one element belonging to the concept class and occurring at the farthest position is identified when the class of the at least one element occurring at the end position within the user-query is the others class. Beneficially, identifying the at least one element of the concept class occurring at the farthest position enables to identify a combined context of the at least one element of the concept class occurring at the end position, and the at least one element of the concept class occurring at the farthest position within the user-query. In the second example, the at least one element of the concept class occurring at the end position is "cell mutation" and at least one element of the concept class occurring at the farthest position, subsequent to changing the class of "cell mutation" to the others class, is "cell division". The method comprises concatenating the at least one element of the concept class occurring at the farthest position with each of the at least one element occurring thereafter, to obtain a concatenated string of elements. Specifically, the at least one element of the concept class occurring at the farthest position within the user-query is linked with the at least one element occurring thereafter to form the concatenated string of elements, such that the identified at least one element of the concept class occurring at the farthest position within the user-query appears at a first position in the resulting concatenated string of elements.

Furthermore, the method comprises identifying at least one suggestion associated with the concatenated string of elements using the ontology. For example, keywords, elements or concepts of the ontology that are associated with the concept of the concatenated string of elements are identified as the at least one suggestion for the user-query. In an example an ontology related to subject matter "life science" may be developed and a user-query "platelets, red blood cell and white blood cell" may be provided by a user. Such a user-query may be used to obtain a concatenated string of elements "red blood cell and white blood cell". Furthermore, the ontology may include keywords such as "count", "structure", "range" and so forth that co-occur in the ontology, wherein the keywords are associated with the concept of the concatenated string of elements "red blood cell and white blood cell". It will be appreciated that the concept "red blood cell and white blood cell" are common between the ontology and the user-query. Therefore, the keywords, key-phrases and/or elements that are common for the concept in the ontology and the user-query may be identified as suggestions for completion of the user-query.

Optionally, the method further comprises acquiring web-content related to the subject matter from existing data sources, wherein the web-content comprises at least one data record related to at least one topic associated with the subject matter. Throughout the present disclosure, the term "existing data sources" as used herein, relates to accessible resources that include information related to the subject matter. Such existing data sources can be associated with a server arrangement hosting a web site, a web page, or other item of interest that are accessible on the web. Furthermore, the server arrangement is adapted to serve the web-content using any internetworking protocols. Moreover, the web-content is not limited to content uploaded or downloaded via the Internet or the Hyper Text Transfer Protocol (HTTP). Optionally, the existing data sources can be a proprietary data repository that is operable to store information related to the subject matter. Throughout the present disclosure, the term "web-content" relates to content accessible over the web, or over other portions of the Internet. Such web-content can be accessed by the programmable and/or non-programmable components while browsing the web. Furthermore, the web-content may comprise the at least one data record in a form of one or more documents, files, scripts, codes, executable programs, web pages or any other digital data that can be transmitted via a network (such as the Internet). In a fourth example, the web-content may be associated with "lung cancer" that is provided on an informational website related to lung cancer. In such an example, the at least one data record can be documents (such as research papers, PDFs, theses and so forth) that is accessed from a website related to the subject matter "lung cancer". Furthermore, the at least one data record will include information about at least one topic related to the subject matter of "lung cancer", such as, "lung cancer cure", "lung cancer symptoms", "lung cancer medications" and so forth.

The method further comprises determining an activity factor of a plurality of users for the each of at least one topic using the at least one data record. The term "activity factor" as used throughout the present disclosure, relates to a number of data records referencing each of the at least one topic therein. Furthermore, such references may be made by the plurality of users (such as scientists, organizations, professionals, experts and so forth) in data records that include research papers, theses, conference papers, patent documents, and so forth. For example, the topics "lung cancer cure", "lung cancer symptoms", "lung cancer medications" are referenced in 12860, 9270 and 10020 documents respectively (for example, within a period of 24 months) by the plurality of people associated with a field of "lung cancer research". In such an instance, the topics "lung cancer cure", "lung cancer symptoms", "lung cancer medications" are associated with the activity factor 12860, 9270 and 10020 respectively. Optionally, the activity factor for each of the at least one topic may be normalized. In such an instance, topics "lung cancer cure", "lung cancer symptoms", "lung cancer medications" are associated with activity factors of 12.86, 0.927 and 1.002 respectively, subsequent to normalizing by a unit of 10,000 references (such as, 10,000 being the activity factor for the subject matter "lung cancer"). The method further comprises assigning a score to each of the at least one topic based on the activity factor for each of the at least one topic. For example, the score may be assigned to each of the at least one topic based on the activity factor thereof within the subject matter. In the fourth example, the topic "lung cancer cure" having the activity factor of 12860 (or 1.286) is assigned a high score whereas the topic "lung cancer symptoms" having the activity factor of 9270 (or 0.927) is assigned a relatively low score within the subject matter of "lung cancer". Furthermore, the topic "lung cancer medications" having the activity factor of 10020 (or 1.002) is assigned an intermediate score between the scores associated with the topics "lung cancer cure" and "lung cancer symptoms".

Optionally, identifying the at least one suggestion further comprises discarding the at least one element occurring at a first position in the concatenated string of elements. Furthermore, when the at least one suggestion for the concatenated string is not identified, the concatenated string may be traversed and the at least one element at a first position thereof may be discarded. The discarded at least one element may belong to the concept class or the others class. In an example, the ontology is developed related to a subject matter of "lung cancer". Furthermore, a concatenated string of elements "non-small cell and liver cancer" is obtained. Moreover, elements of the concatenated string are ordered and "non-small cell" is assigned a first position, "and" is assigned a second position and "liver cancer" is assigned a third position. In such an instance, if no suggestions for the concatenated string of elements can be identified, the element "non-small cell" occurring at the first position is discarded.

Optionally, the discarding is performed iteratively until the concatenated string of elements includes a single element. Specifically, discarding of the at least element at first position is performed repetitively until at least one suggestion corresponding to the concatenated string of elements is not identified. Beneficially, discarding of the at least one element at the first position of the concatenated string of elements may alter the context thereof. Subsequently, the ontology is accessed to identify at least one suggestion associated with the concatenated string of elements associated with the altered context. Furthermore, if no suggestion can be identified for the concatenated string of elements associated with the altered context, the discarding is performed until only one element remains in the concatenated string of elements. In one example, the ontology may be developed for the subject matter of "machines". Furthermore, a user may provide the user-query "road air pollution and the engine". Subsequently, a concatenated string of elements "air pollution and the engine" is obtained after discarding the element "road". Thereafter, at a first iteration, element "air" may be discarded upon unsuccessful identification of suggestions from the ontology for the concatenated string of elements. Therefore, the resulting concatenated string of elements will be "pollution and the engine". Furthermore, at a second iteration, element "pollution" may be discarded from the concatenated string of elements upon unsuccessful identification of suggestions from the ontology. Thus, the resulting concatenated string of elements will be "and the engine". Similarly, at a third and fourth iterations, the elements "and" and "the" will be discarded respectively such that the resulting concatenated string of elements includes the single element "engine". Subsequently, suggestions for "engine" may be identified from the ontology.

Furthermore, unsuccessful identification of the at least one suggestion may occur because of an error in spelling in the user-query. Optionally, identifying the at least one suggestion comprises performing a spell-check of the concatenated string of elements after discarding the at least one element occurring at the first position. Such a spell-check is performed when the iterative discarding of elements of the concatenated string remains unsuccessful in identifying at least one suggestion. Optionally, the spell-check relates to checking and validating of grammatical and/or contextual meaning of elements, in addition to checking and validating the spelling of the concatenated string of elements. Optionally, the spell-check is performed using the ontology. In an example, the spelling of the elements in the concatenated are matched with concepts in the ontology. Specifically, the ontology acts as a basis for checking the spelling of elements in the concatenated string of elements. In another example, the spell-check may be performed by using an edit distance technique, such as, by calculating a similarity (or difference) between elements of the concatenated string and similar keywords, elements and/or concepts within the ontology. Specifically, the similarity or the difference may be calculated by determining similarity score or a difference score respectively. Furthermore, the spelling of an element in the concatenated string of elements is corrected if it has a high similarity score (or a low difference score) with a keyword, element or concept within the ontology. Optionally, the similarity score may be associated with a threshold value, wherein the spelling of the element of the concatenated string of elements is corrected if the similarity score is equal to or more than the threshold value. In an example, the ontology is developed for the subject matter "plants" and the concatenated string of elements "leaves and leaf anatomy" may be obtained. Furthermore, upon unsuccessful identification of suggestions using the ontology, a spell-check of the concatenated string of elements "leaves and leaf anatomy" is performed. Subsequently, a similarity score may be calculated between elements of the concatenated string and concepts of the ontology. Moreover, the element of the concatenated string "leaf anatomy" may have a 98% similarity score with the concept "leaf anatomy" included in the ontology. In such an instance, the threshold value for the similarity score may be 90%. Thus, the spelling of the concatenated string of elements may be corrected to "leaves and leaf anatomy".

Optionally, the spell-check is performed iteratively until the concatenated string of elements includes a single element. Specifically, the spelling of each element in the concatenated string of elements is checked. In an example, the method performs identification of at least one suggestion each time a spelling is corrected. In an example, the ontology for the subject matter "plants" is developed and a concatenated string of elements "root leaves and steam" may be obtained. Furthermore, the element "root" is discarded from the concatenated string of elements and a spell-check is performed of the resulting concatenated string of elements "leaves and steam". In such an instance, if a phrase such as "leaves and stem" can be identified, the spelling of the concatenated string of elements "leaves and steam" is corrected to "leaves and stem". Alternatively, upon unsuccessful identification of at least one suggestion (and/or correct spelling) for "leaves and steam", the element "leaves" may be discarded to obtain the concatenated string of elements "and steam". Subsequently, upon unsuccessful identification of at least one suggestion for the concatenated string of elements, the element "and" may be discarded. Therefore, the resulting concatenated string of elements will be "steam". Subsequently, a spell-check is performed for the element "steam". Consequently, the spelling of the element may be changed to "stem". Furthermore, the ontology may be used to identify suggestions such as "of plant", "structure", "composition" and so forth for completing the user-query. Furthermore, performing such iterative spell-check of the elements of the concatenated string of the elements helps in identifying at least one suggestion associated with the concatenated string of elements.

Furthermore, the method comprises providing the at least one suggestion for completing the user-query. For example, when the at least one suggestion associated with the concatenated string of elements is identified, the at least one suggestion is provided to the user for completing the partially complete user-query. In an example, the suggestion may be provided on a portion of a screen, below the partially complete user-query. Additionally, the suggestion may have different font attributes (such as, font colour, font size, capitalization, font type and so forth) than the font used by the user for providing the user-query. Optionally, the provided at least one suggestion is associated with at least one topic having highest score within the subject matter. In the fourth example, the "lung cancer cure" having the highest score within the subject matter of "lung cancer", is provided as the at least one suggestion for completing the user-query of "lung cancer". Alternatively, and optionally, the provided at least one suggestion is associated with at least one topic having the score above a predefined threshold. In the fourth example, the topics "lung cancer cure" and "lung cancer medications" that are associated with the high and intermediate activity factors respectively, may have the score above the predetermined threshold and consequently, the topics are provided as the at least one suggestion for competing the user-query. Furthermore, the topic "lung cancer medications" having the low activity factor, may not be provided as the at least one suggestion for completing the user-query.

In an exemplary implementation of the disclosed method, an ontology with "pharmaceutical" as subject matter is developed. Specifically, the ontology includes concepts of pharmaceuticals and related fields. Subsequently, a partially complete user-query "the red blood cell liver cancer and non-small cell" is provided by a user, wherein the user-query is related to a domain of user-interest. Furthermore, it is determined if the domain of user-interest corresponds to the subject matter of the ontology, for example, by employing a natural language toolkit (NLTK). Moreover, the position of various elements in the user-query is determined, such as, based on a reading-order thereof. Subsequently, each element in the user-query is classified into concept class or others class based on contextual meaning thereof. Specifically, "the" is assigned a first position and others class, "red blood cells" is assigned a second position and concept class, "liver cancer" is assigned a third position and concept class, "and" is assigned a fourth position and others class, "non" is assigned a fifth position and others class and "small cell" is assigned a sixth position and concept class. Furthermore, the class of the element "small cell" (associated with the concept class) at the end position within the user-query is changed to the others class. Furthermore, the element "liver cancer" associated with the concept class and occurring at the farthest position is used to form the concatenated string, by linking the elements "and", "non" and "small cell" therewith. The resulting concatenated string of elements is "liver cancer and non-small cell". Furthermore, the ontology is checked to identify at least one suggestion for the concatenated string of elements and when no suggestion is identified, the element "liver cancer" occurring at the first position in the concatenated string of elements is discarded. Consequently, the resulting concatenated string of elements is "and non-small cell". Furthermore, at least one suggestion for the resulting concatenated string of elements is identified using the ontology. In such an instance, the at least one suggestion may not be identified for the resulting concatenated string of elements. Furthermore, the element occurring at the first position in the concatenated string is iteratively discarded. The resulting concatenated string obtained after discarding the element "and" is "non-small cell". In such an instance, suggestion "non-small cell lung cancer" and "non-small cell lung cancer symptoms" are identified using the ontology. Subsequently, the identified suggestions are provided to the user for completing the user-query.

Disclosed is the system for providing at least one suggestion for completing a user-query. The system comprises the processing module that is operable to receive the user-query related to a domain of user-interest; determine if the domain of user-interest corresponds to the subject matter using an ontology that relates to the subject matter; identify at least one element of the user-query when the domain of user-interest corresponds to the subject matter, characterized in that the at least one element occurs at a specific position within the user-query; classify the at least one element into at least one class using the ontology, characterized in that the at least one class comprises a concept class and an others class; change the class of the at least one element occurring at an end position within the user-query to the others class, if the class of the at least one element is the concept class; identify the at least one element of the concept class occurring at a farthest position within the user-query; concatenate the at least one element of the concept class occurring at the farthest position within the user-query with each of the at least one element occurring after the at least one element, to obtain a concatenated string of elements; identify at least one suggestion associated with the concatenated string of elements using the ontology; and provide the at least one suggestion for completing the user-query.

Furthermore, the term "processing module" relates to a computational element that is operable to respond to and process instructions that drive the system. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processing module may comprise one or more individual processors, processing devices and various elements associated with a processing device that may be shared by other processing devices. Additionally, the one or more individual processors, processing devices and elements are arranged in various architectures for responding to and processing the instructions that drive the system.

Furthermore, the system for providing at least one suggestion for completing a user-query comprises a database arrangement communicably coupled to the processing module, characterized in that the database arrangement is operable to store the ontology. Furthermore, the term "database arrangement" as used herein relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, for example, a relational database like IBM DB2 and Oracle 9. Optionally, the database arrangement may be operable to support relational operations, regardless of whether it enforces strict adherence to the relational model, as understood by those of ordinary skill in the art. Additionally, the database arrangement may be populated by data elements. Furthermore, the data elements may include data records, bits of data, cells, and so forth. Moreover, the database arrangement may be implemented in a centralized or distributed architecture.

Optionally, communication between the processing module and the database arrangement may be facilitated by a communication module operable to transmit data from one location to another. The term "communication module" may relate to an arrangement of interconnected programmable and/or non-programmable components that are configured to facilitate data communication between one or more electronic devices and/or databases, whether available or known at the time of filing or as later developed. Furthermore, the communication module may facilitate communication using, but not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, and any other communication system or systems at one or more locations. Additionally, the communication module employs wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is described herein as being implemented with TCP/IP communications protocols, the system may also be implemented using IPX, Appletalk, IP-6, NetBIOS, OSI, any tunnelling protocol (e.g. IPsec, SSH), or any number of existing or future protocols. Consequently, the communication module is operable to transmit the at least one suggestion using the ontology stored in the database arrangement to the processing module that is operable provide the at least one suggestion to the user.

Optionally, the processing module is further operable to develop the ontology that relates to the subject matter.

Optionally, the processing module is further operable to identify the at least one suggestion by discarding the at least one element occurring at a first position in the concatenated string of elements.

Optionally, the processing module is further operable to perform the discarding iteratively until the concatenated string of elements includes a single element.

Optionally, the processing module is further operable to perform a spell-check of the concatenated string of elements after discarding the at least one element occurring at the first position.

Optionally, the spell-check is performed iteratively until the concatenated string of elements includes a single element.

Optionally, the processing module is further operable to perform spell-check using the ontology.

Optionally, the processing module is further operable to acquire web-content related to the subject matter from existing data sources, wherein the web-content comprises at least one data record related to at least one topic associated with the subject matter; determine an activity factor of a plurality of users for each of the at least one topic using the at least one data record; and assign a score to each of the at least one topic based on the activity factor for each of the at least one topic.

Optionally, the processing module is operable to provide at least one suggestion using at least one topic having highest score within the subject matter.

Furthermore, there is disclosed a computer readable medium, containing program instructions for execution on a computer system, which when executed by a computer, cause the computer to perform method steps for providing at least one suggestion for completing a user-query. The method comprising the steps of: receiving the user-query related to a domain of user-interest; determining if the domain of user-interest corresponds to a subject matter using an ontology that relates to the subject matter; identifying at least one element of the user-query when the domain of user-interest corresponds to the subject matter; classifying the at least one element into at least one class using the ontology, characterized in that the at least one class comprises a concept class and an others class; changing the class of the at least one element occurring at an end position within the user-query to the others class, if the class of the at least one element is the concept class; identifying the at least one element of the concept class occurring at a farthest position within the user-query; concatenating the at least one element of the concept class occurring at the farthest position within the user-query with each of the at least one element occurring thereafter, to obtain a concatenated string of elements; identifying at least one suggestion associated with the concatenated string of elements using the ontology; and providing the at least one suggestion for completing the user-query.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1A:
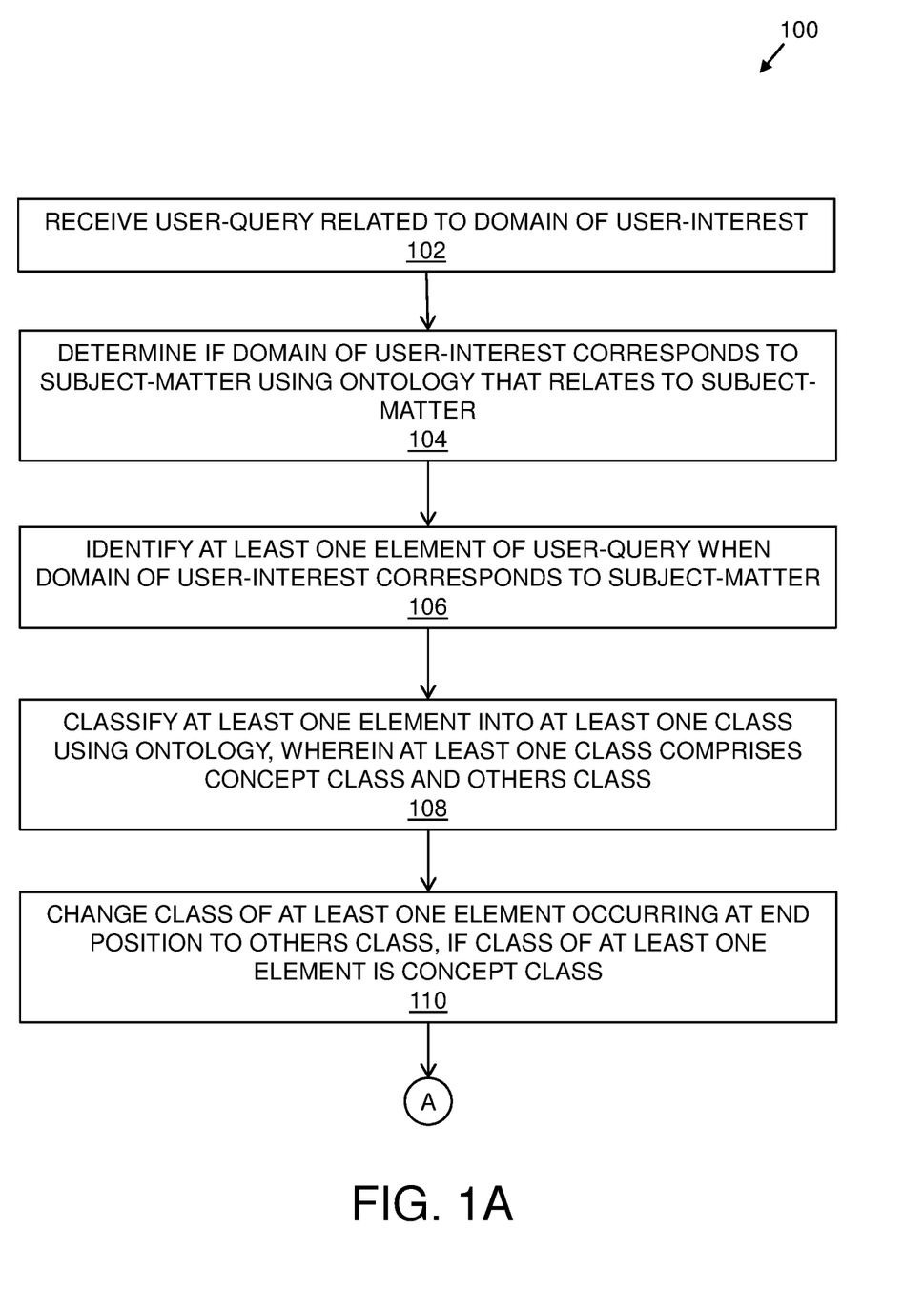
FIGS. 1A-B are illustrations of steps of a method of providing at least one suggestion for completing a user-query, in accordance with an embodiment of the present disclosure.
Figure 1B:
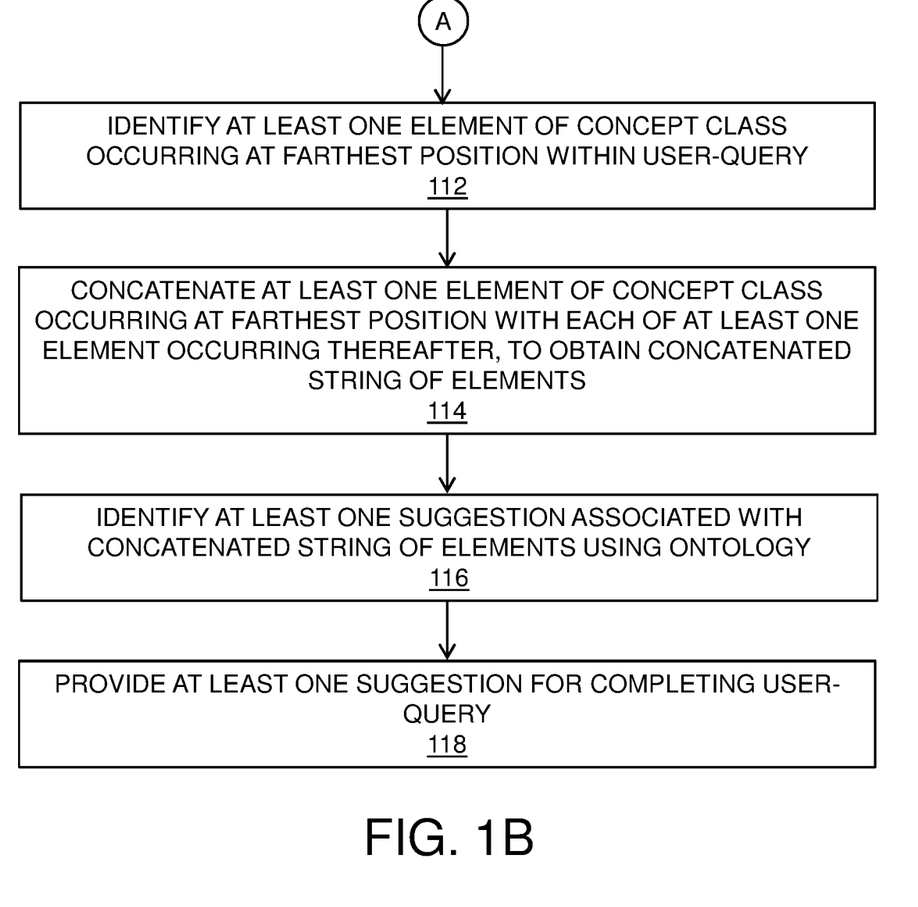

Referring to FIG. 1A-B, there are shown steps of a method 100 of providing at least one suggestion for completing a user-query, in accordance with an embodiment of the present disclosure. At a step 102, user-query related to a domain of user-interest is received. At a step 104, it is determined that if the domain of user-interest corresponds to the subject matter using an ontology that relates to the subject matter. At a step 106, at least one element of the user-query is identified when the domain of user-interest corresponds to the subject matter. At a step 108, the at least one element is classified into at least one class using the ontology, such that the at least one class comprises a concept class and an others class. At a step 110, the class of the at least one element occurring at an end position within the user-query is changed to the others class, if the class of the at least one element is the concept class. At a step 112, the at least one element of the concept class occurring at a farthest position within the user-query is identified. At a step 114, the at least one element of the concept class occurring at the farthest position within the user-query is concatenated with each of the at least one element occurring thereafter, to obtain a concatenated string of elements. At a step 116, at least one suggestion associated with the concatenated string of elements using the ontology is identified. At a step 118, the at least one suggestion for completing the user-query is provided.

The steps 102 to 118 are only illustrative and other alternatives can also be provided where one or more steps are added, one or more steps are removed, or one or more steps are provided in a different sequence without departing from the scope of the claims herein. In an example, the step 116 further comprises discarding the at least one element occurring at a first position in the concatenated string of elements. In another example, the discarding is performed iteratively until the concatenated string of elements includes a single element.

In one example, a spell-check of the concatenated string of elements is performed after discarding the at least one element occurring at the first position. In another example, the spell-check is performed iteratively until the concatenated string of elements includes a single element. In yet another example, the spell-check is performed using the ontology.

In an example, the method 100 further comprises acquiring web-content related to the subject matter from existing data sources, wherein the web-content comprises at least one data record related to at least one topic associated with the subject matter; determining a activity factor by a plurality of users for each of the at least one topic using the at least one data record; and assigning a score to each of the at least one topic based on the activity factor for each of the at least one topic. In another example, the provided at least one suggestion at the step 118 is associated with at least one topic having highest score within the subject matter.

Figure 2:
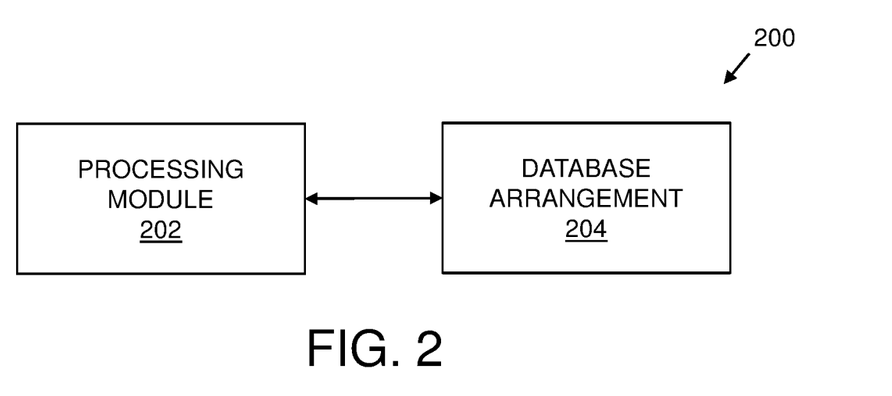
FIG. 2 is a block diagram of a system for providing at least one suggestion for completing a user-query, in accordance with an embodiment of the present disclosure.

Referring to FIG. 2, there is shown a block diagram of a system 200 for providing at least one suggestion for completing a user-query, in accordance with an embodiment of the present disclosure. The system 200 comprises a processing module 202. Furthermore, the system 200 comprises a database arrangement 204 communicably coupled to the processing module 202 wherein the database arrangement 204 is operable to store the ontology.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of providing at least one suggestion for completing a user-query, wherein the method comprises:
   a) receiving the user-query related to a domain of user-interest;

b) determining if the domain of user-interest corresponds to a subject matter using an ontology that relates to the subject matter;
c) identifying elements of the user-query when the domain of user-interest corresponds to the subject matter;
d) classifying the elements of the user query into a concept class and an others class using the ontology, wherein an element of the user-query that corresponds to one or more concepts in the ontology is classified into the concept class, whereas an element of the user-query that does not correspond to any concept in the ontology is classified into the others class;
e) identifying a given element at an end position in the user-query and changing the class of the given element to the others class if the given element was initially classified into the concept class;
f) identifying at least one element that is classified into the concept class occurring farthest from the start position within the user-query;
g) concatenating the identified at least one element with each of the remaining elements of the user-query, to obtain a concatenated string of elements;
h) identifying at least one suggestion associated with the concatenated string of elements using the ontology; and
i) providing the at least one suggestion for completing the user-query.

2. The method of claim 1, wherein the method further comprises developing the ontology that relates to the subject matter.

3. The method of claim 1, wherein identifying the at least one suggestion at (h) further comprises discarding an element occurring at a first position in the concatenated string of elements.

4. The method of claim 3, wherein the discarding is performed iteratively until the concatenated string of elements includes a single element.

5. The method of claim 3, wherein the method further comprises performing a spell-check of the concatenated string of elements after discarding the element occurring at the first position.

6. The method of claim 5, wherein the spell-check is performed iteratively until the concatenated string of elements includes a single element.

7. The method of claim 5, wherein the spell-check is performed using the ontology.

8. The method of claim 1, wherein the method further comprises:
acquiring web-content related to the subject matter from existing data sources, wherein the web-content comprises at least one data record related to at least one topic associated with the subject matter;
determining an activity factor of a plurality of users for each of the at least one topic using the at least one data record; and
assigning a score to each of the at least one topic based on the activity factor for each of the at least one topic.

9. The method of claim 8, wherein the provided at least one suggestion at (i) is associated with at least one topic having highest score within the subject matter.

10. A system for providing at least one suggestion for completing a user-query, wherein the system comprises:
a processor that is operable to:
receive the user-query related to a domain of user-interest;
determine if the domain of user-interest corresponds to the subject matter using an ontology that relates to the subject matter;
identify elements of the user-query when the domain of user-interest corresponds to the subject matter;
classify the elements of the user query into a concept class and an others class using the ontology, wherein an element of the user-query that corresponds to one or more concepts in the ontology is classified into the concept class, whereas an element of the user-query that does not correspond to any concept in the ontology is classified into the others class;
identify a given element at an end position in the user-query and change the class of the given element to the others class if the given element was initially classified into the concept class;
identify at least one element that is classified into the concept class occurring at a farthest from the start position within the user-query;
concatenate the identified at least one element with each of the remaining elements of the user query to obtain a concatenated string of elements;
identify at least one suggestion associated with the concatenated string of elements using the ontology; and
provide the at least one suggestion for completing the user-query;
and
a database communicably coupled to the processor wherein the database is operable to store the ontology.

11. The system of claim 10, wherein the processor is further operable to develop the ontology that relates to the subject matter.

12. The system of claim 10, wherein the processor is further operable to identify the at least one suggestion by discarding an element occurring at a first position in the concatenated string of elements.

13. The system of claim 12, wherein the processor is further operable to perform the discarding iteratively until the concatenated string of elements includes a single element.

14. The system of claim 12, wherein the processor is further operable to perform a spell-check of the concatenated string of elements after discarding the element occurring at the first position.

15. The system of claim 14, wherein the spell-check is performed iteratively until the concatenated string of elements includes a single element.

16. The system of claim 14, wherein the processor is further operable to perform spell-check using the ontology.

17. The system of claim 10, wherein the processor is further operable to:
acquire web-content related to the subject matter from existing data sources, wherein the web-content comprises at least one data record related to at least one topic associated with the subject matter;
determine an activity factor of a plurality of users for each of the at least one topic using the at least one data record; and
assign a score to each of the at least one topic based on the activity factor for each of the at least one topic.

18. The system of claim 17, wherein the processor is operable to provide at least one suggestion using at least one topic having highest score within the subject matter.

19. A non-transitory computer readable storage medium, containing program instructions for execution on a computer system, which when executed by a computer, cause the computer to perform method steps for providing at least one suggestion for completing a user-query, the method comprising the steps of:

a) receiving the user-query related to a domain of user-interest;
b) determining if the domain of user-interest corresponds to a subject matter using an ontology that relates to the subject matter;
c) identifying elements of the user-query when the domain of user-interest corresponds to the subject matter;
d) classifying the elements of the user query into a concept class and an others class using the ontology, wherein an element of the user-query that corresponds to one or more concepts in the ontology is classified into the concept class, whereas an element of the user-query that does not correspond to any concept in the ontology is classified into the others class;
e) identifying a given element at an end position in the user-query and changing the class of the given element to the others class if the given element was initially classified into the concept class;
f) identifying at least one element that is classified into the concept class occurring farthest from the start position within the user-query;
g) concatenating the identified at least one element with each of the remaining elements of the user-query, to obtain a concatenated string of elements;
h) identifying at least one suggestion associated with the concatenated string of elements using the ontology; and
i) providing the at least one suggestion for completing the user-query.

* * * * *